United States Patent [19]

Manfred et al.

[11] 3,995,381
[45] Dec. 7, 1976

[54] LOW VISIBILITY ANSWER SHEET AND METHOD OF TESTING

[76] Inventors: Ken Max Manfred, Volta 957, Jdnes, Metropolitanos; Joaquin Garcia de la Noceda, Teniente Ramirez 1165, Urb. San Agustin; Severino Ramos, Afrodita 674, Venus Gardens, all of, Rio Piedras, P.R.

[22] Filed: June 27, 1975

[21] Appl. No.: 591,107

[52] U.S. Cl. .......................... 35/48 A; 235/61.12 N
[51] Int. Cl.² .......................................... G09B 3/00
[58] Field of Search ...................... 35/48 A, 48 B; 235/61.12 N; 282/22 R, 23 R

[56] References Cited
UNITED STATES PATENTS

| | | | |
|---|---|---|---|
| 2,396,833 | 3/1946 | D'Humy | 282/22 R |
| 3,203,116 | 8/1965 | Shaw et al. | 35/48 A |
| 3,284,929 | 11/1966 | Azure | 35/48 B |
| 3,353,845 | 11/1967 | Curran | 282/23 R |

*Primary Examiner*—William H. Grieb
*Attorney, Agent, or Firm*—Allegretti, Newitt, Witcoff & McAndrews

[57] ABSTRACT

A low visibility answer sheet and method of testing utilizing the same in which the answer areas on a multiple choice answer sheet are predarkened. The answers are made by darkening over a desired predarkened area. The contrast between a predarkened area which has been marked and a predarkened area which has not been marked by an examinee is significantly reduced and thus the potential for cheating by examinees viewing the answers entered by other examinees is decreased.

11 Claims, 2 Drawing Figures

LOW VISIBILITY ANSWER SHEET AND METHOD OF TESTING

BACKGROUND OF THE INVENTION

The present invention concerns an improved answer sheet and testing method for use primarily in conjunction with multiple choice examinations and/or tests in which the examinee enters an answer by selecting the desired answer from a plurality of answer areas predesignated on the sheet and darkening over the desired answer area.

Multiple choice, objective exams and tests are presently in common use. These exams and tests employ predesigned answer sheets having multiple choice answer areas. After an examinee completes an answer sheet by darkening desired answer areas on the sheet, the answer sheet is analyzed. The analysis of the answer sheet may be accomplished in a variety of ways. A stencil conforming to the general outline of the answer sheet may be placed over the sheet. The correct answers are designated as holes punched into the stencil and the answer sheet may be analyzed accordingly. Another more efficient form of review which has been used is to automatically optically scan the answer sheet and transfer the output of the scanner to a computer which tabulates and publishes the test results in a legible form. While this type of answer sheet has been generally effective for the purpose intended, it has given rise to an undesirable potential for cheating by which one examinee may view the answers of another examinee and copy the answers onto his own answer sheet. Because of the objective nature of a multiple choice test, the occurrence of cheating is made more difficult to detect and thus the deterence to cheating is decreased.

SUMMARY OF THE INVENTION

The present invention is generally related to a low visibility answer sheet and method of testing utilizing the same. The low visibility answer sheet of this invention is of the type which includes a plurality of uniquely identified groups of answer areas with each of the groups having at least two areas associated with the group at which an answer may be indicated by darkening or marking the desired area with a writing instrument. In the answer sheet of this invention, each of the answer areas are substantially uniformly predarkened so that the contrast between marked answer areas and unmarked answer areas is substantially decreased thus minimizing the potential for cheating.

In preferred embodiments of this invention the answer sheet is predarkened with brown, royal blue or purple.

This invention is also related to a method of testing which includes the steps of providing multiple choice answer sheets having a plurality of predarkened answer areas thereon, providing a writing instrument capable of marking said answer sheet with a mark which is less light reflective than the unmarked predarkened answer areas on said answer sheet, darkening desired predarkened answer areas with the writing instrument and reviewing said answer sheet to determine the results of the test.

An object to the present invention is to provide an improved multiple choice answer sheet for use in conjunction with a test and/or exam in which the potential for cheating will be minimized.

Another object of the present invention is to provide a multiple choice answer sheet in which the contrast between a marked and an unmarked answer area will be significantly reduced.

Still a further object of the invention is to provide a multiple choice answer sheet in which the visual contrast between a marked and unmarked answer area will be significantly reduced and yet one which may be reviewed by an automatic optical scanner.

Still a further object of the invention is to provide a method of testing in which the potential for cheating will be substantially decreased and at the same time the efficiency of review of the answer sheet will not be diminished.

These and other objects, advantages and features of the present invention will be more fully explained and discussed in a detailed description of the preferred embodiment which follows.

BRIEF DESCRIPTION OF THE DRAWINGS

There follows a brief description of the drawings showing a presently preferred embodiment of the present invention wherein like numerals refer to like elements and wherein.

DETAILED DESCRIPTION OF THE PREFERRED EMBODIMENT

Figure 1:
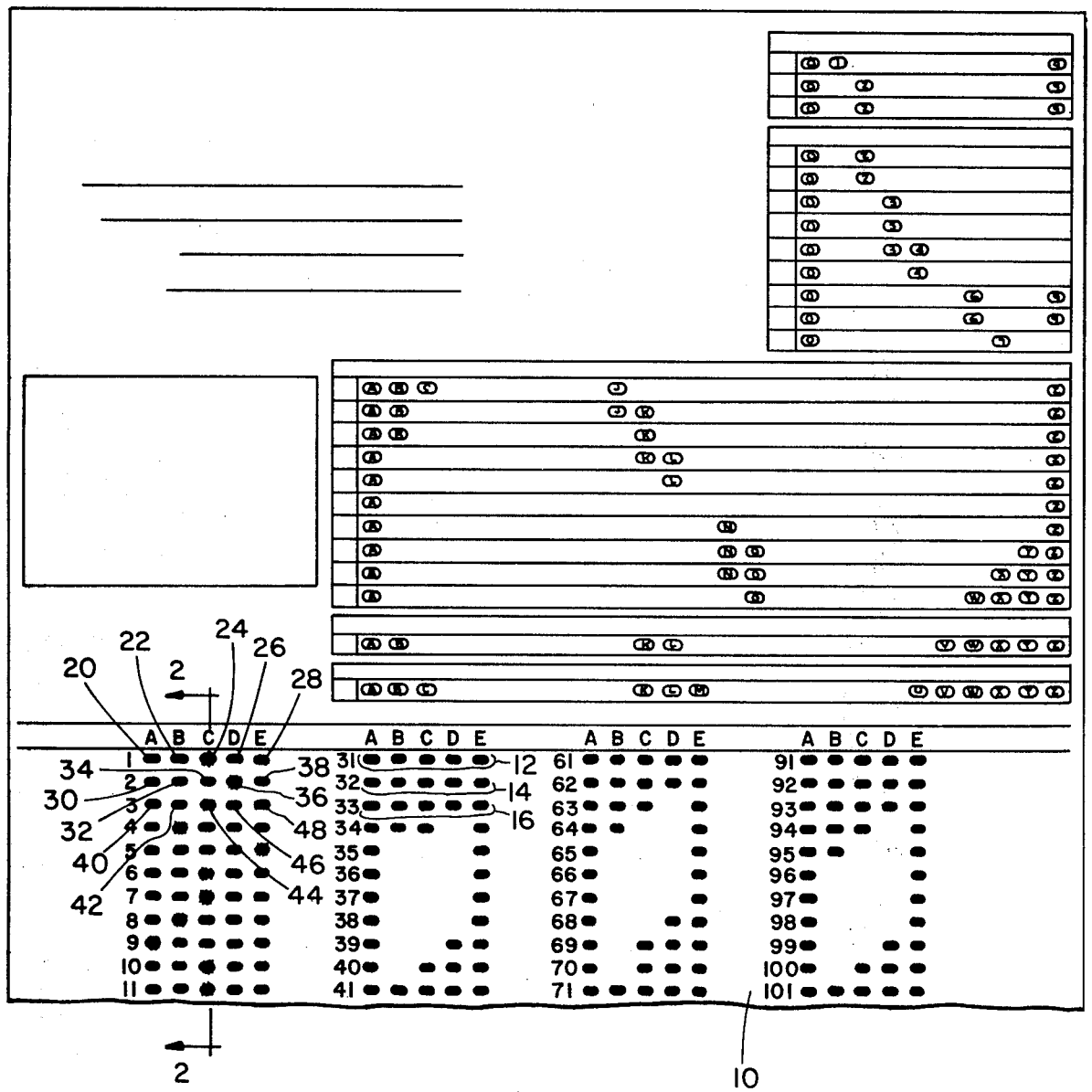
FIG. 1 is a sketch of a portion of an answer sheet of the type adapted for use in conjunction with the present invention.
Figure 2:
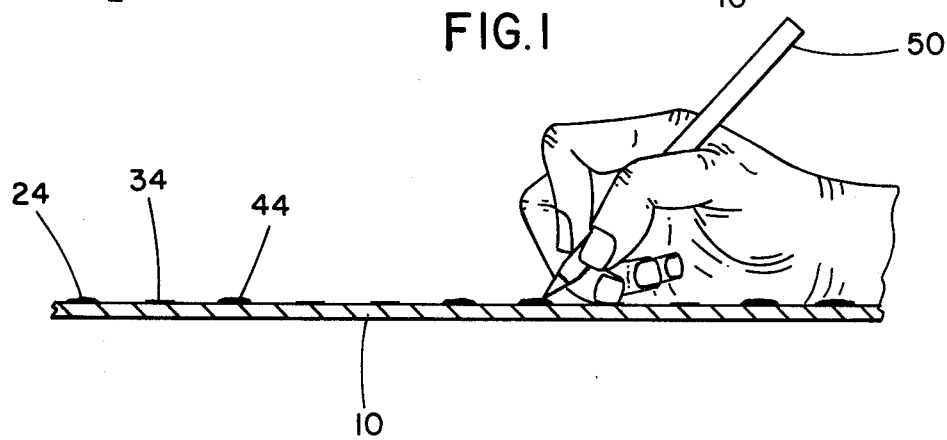
FIG. 2 is a cross sectional view of a portion of the answer sheet of FIG. 1 taken substantially along the lines 2—2 thereof.

Referring now to FIGS. 1 and 2, there is shown an answer sheet 10 having a plurality of uniquely identified groups of answer areas 12, 14, 16 and so on. Groups 12, 14, 16 and so on each contain a plurality of five potential answer areas 20, 22, 24—to 48 aligned in columns identified with the block letters A through E.

In the low visibility answer sheet 10 of this invention, each of the answer areas 20, 22, 24—48 is substantially uniformly predarkened so that the visual contrast between answer areas marked with the writing instrument, 50, and unmarked answer areas is significantly reduced thereby minimizing the potential for cheating.

Applicants have found that when used with one or more of the following designated writing instruments, the following predarkened colors may be efficiently used on applicant's answer sheet 10 to significantly decrease the contrast between marked and unmarked answer areas and yet permit accurate automatic optical scanning of the answer sheet.

| Predarkened Color | Writing Instrument |
| --- | --- |
| Royal blue | (a) graphite pencil |
| | (b) black ball point pen |
| | (c) blue ball point pen |
| | (d) blue crayon |
| | (e) black crayon |
| Brown | (a) graphite pencil |
| | (b) black ball point pen |
| | (c) blue ball point pen |
| | (d) blue crayon |
| | (e) black crayon |
| Purple | (a) graphite pencil |
| | (b) black ball point pen |
| | (c) blue ball point pen |
| | (d) blue crayon |
| | (e) black crayon |

Dark green should not be used with the above listed writing instruments since it makes automatic optical scanning difficult when used with traditional marking instruments. In accordance with this invention, the answer sheet is predarkened with a color which is more reflective of light than the mark made by the writing instrument used in conjunction with the answer sheet of this invention. Other predarkening colors may be used with other types of writing instruments to achieve the beneficial results of this invention; however, the colors of brown and royal blue have proved most successful and efficient.

The present invention is also related to a method of testing in which there is provided a multiple choice answer sheet 10 predarkened in a plurality of answer areas to form a low visibility answer sheet. Also provided is the writing instrument 50 capable of marking the answer sheet with a mark which is less light reflective than the predarkened answer areas, darkening the desired answer areas with the writing instrument 50 and reviewing the answer sheet either manually or automatically to determine the results of the test. Review of the answer sheet can be done automatically with the use of an optical mark reader. For example, the answer sheet of our invention has been used with an IBM 3881 Optical Scanner (one type of an optical mark reader), together with an IBM 370-145 computer for processing the information from the IBM 3881 Optical Scanner and excellent results were obtained.

Although this answer sheet is primarily designed for use in conjunction with an automatic optical mark reader, it is also possible to review the answer sheet manually since the low contrast characteristics of the answer sheet of this invention still permit an examinee or test reviewer to visually distinguish marked answer areas from unmarked answer areas. The colors which have been found most beneficial in conjunction with this invention are royal blue and brown.

While in the foregoing there has been described a presently preferred embodiment of the present invention, it should be understood that this embodiment is illustrative of the principals of the invention and that other embodiments may be made without departing from the true spirit and scope thereof.

What is claimed is:

1. A multiple choice low visibility answer sheet on which a plurality of multiple choice answers are to be placed, comprising a plurality of uniquely identified groups of answer areas having regions defined on said answer sheet, a plurality of discrete answer areas located within each of said groups at which an answer may be indicated by marking over a desired discrete answer area in a group with a marking instrument, said discrete answer areas being substantially uniformly predarkened in relation to the regions of the groups surrounding said discrete answer areas and the contrast between marked and unmarked discrete answer areas being decreased, thereby decreasing the possibility of cheating.

2. The invention as set forth in claim 1 wherein the discrete answer areas of said sheet are colored brown.

3. The invention as set forth in claim 1 wherein the discrete answer areas of said sheet are colored royal blue.

4. The invention as set forth in claim 1 wherein the discrete answer areas of said sheet are colored purple.

5. A method of objectively testing comprising the steps of:
providing to an examinee a multiple choice low visibility answer sheet having a plurality of uniquely identified groups of answer areas having regions defined on said sheet with a plurality of discrete answer areas located within each of said groups at which an answer may be indicated by marking over a desired discrete answer area in a group, said discrete answer areas being substantially uniformly predarkened in relation to the regions of the groups surrounding said discrete answer areas;
providing to the examinee a writing instrument capable of marking the predarkened discrete answer areas of said answer sheet with a detectable mark;
instructing the examinee to indicate at least one answer with respect to each of said groups by substantially marking over at least one of said predarkened discrete answer areas in a group; and
reviewing the answer sheet to determine the results of the test whereby the possibility of cheating on the test is decreased.

6. The method as set forth in claim 5 wherein said reviewing step includes the step of optically scanning said answer sheets.

7. The method as set forth in claim 5 wherein the predarkened discrete answer areas of said answer sheet are colored brown.

8. The method as set forth in claim 5 wherein the predarkened discrete answer areas of said answer sheet are colored royal blue.

9. The method as set forth in claim 5 wherein the predarkened discrete answer areas of said answer sheet are colored purple.

10. The method as set forth in claim 5 wherein said writing instrument provided is a pencil.

11. The method as set forth in claim 5 wherein said reviewing step includes the step of introducing said marked answer sheet into an optical mark reader.

* * * * *